(12) United States Patent
Bai et al.

(10) Patent No.: US 9,969,916 B2
(45) Date of Patent: May 15, 2018

(54) AQUEOUS POLYURETHANE DISPSERSIONS

(71) Applicants: Dow Global Technologies LLC, Midland, MI (US); Rohm and Haas Company, Philadelphia, PA (US)

(72) Inventors: Chenyan Bai, Shanghai (CN); Zhaohui Qu, Shanghai (CN)

(73) Assignees: ROHM AND HAAS COMPANY, Philadelphia, PA (US); DOW GLOBAL TECHNOLOGIES LLC, Midland, MI (US)

( * ) Notice: Subject to any disclaimer, the term of this patent is extended or adjusted under 35 U.S.C. 154(b) by 88 days.

(21) Appl. No.: 15/165,479

(22) PCT Filed: Dec. 3, 2013

(86) PCT No.: PCT/CN2013/088403
§ 371 (c)(1),
(2) Date: May 26, 2016

(87) PCT Pub. No.: WO2015/081491
PCT Pub. Date: Jun. 11, 2015

(65) Prior Publication Data
US 2016/0304758 A1 Oct. 20, 2016

(51) Int. Cl.
| | |
|---|---|
| C09J 175/08 | (2006.01) |
| C08G 18/48 | (2006.01) |
| C08G 18/66 | (2006.01) |
| C08G 18/79 | (2006.01) |
| C08G 18/28 | (2006.01) |
| C08G 18/32 | (2006.01) |
| C08G 18/40 | (2006.01) |
| C08G 18/42 | (2006.01) |
| B32B 15/095 | (2006.01) |
| B32B 37/12 | (2006.01) |
| B32B 37/14 | (2006.01) |
| C08G 18/12 | (2006.01) |
| C08G 18/76 | (2006.01) |
| C09J 175/06 | (2006.01) |

(52) U.S. Cl.
CPC ........... *C09J 175/08* (2013.01); *B32B 15/095* (2013.01); *B32B 37/12* (2013.01); *B32B 37/14* (2013.01); *C08G 18/12* (2013.01); *C08G 18/283* (2013.01); *C08G 18/288* (2013.01); *C08G 18/3206* (2013.01); *C08G 18/4018* (2013.01); *C08G 18/4277* (2013.01); *C08G 18/4808* (2013.01); *C08G 18/4833* (2013.01); *C08G 18/4854* (2013.01); *C08G 18/4862* (2013.01); *C08G 18/6674* (2013.01); *C08G 18/7671* (2013.01); *C08G 18/792* (2013.01); *C09J 175/06* (2013.01); *C08G 2170/80* (2013.01)

(58) Field of Classification Search
CPC ....... B32B 37/12; C09J 175/04; C09J 175/08; C08J 5/127; C08G 18/12; C08G 18/283; C08G 18/288; C08G 18/3206; C08G 18/4018; C08G 18/4277; C08G 18/4808; C08G 18/4833; C08G 18/4854; C08G 18/4862; C08G 18/6674; C08G 18/7671; C08G 18/792
USPC .......................................... 156/331.4, 331.7
See application file for complete search history.

(56) References Cited

U.S. PATENT DOCUMENTS

| | | | |
|---|---|---|---|
| 4,764,632 A | 8/1988 | Cohen | |
| 5,608,000 A * | 3/1997 | Duan | ................. C08G 18/0819 428/423.1 |

(Continued)

FOREIGN PATENT DOCUMENTS

| | | |
|---|---|---|
| EP | 3622436 A1 | 11/1994 |
| JP | -101146921 A | 6/1989 |
| JP | -106172639 A | 6/1994 |

OTHER PUBLICATIONS

"Chartwell Adhesion Promoters" collection of pp. as published on www.chartwellintl.com on Oct. 2011 as captured by archive.org (pp. 1-9).*

(Continued)

*Primary Examiner* — John Goff
(74) *Attorney, Agent, or Firm* — Carl P. Hemenway

(57) ABSTRACT

Provided is an aqueous polyurethane dispersion comprising (a) dispersed particles of said polyurethane, wherein said polyurethane is the reaction product of polyurethane formation reactants comprising (i) one or more polyisocyanate, (ii) a polyol component comprising one or more polyol, and (iv) one or more organometallic compound having the structure

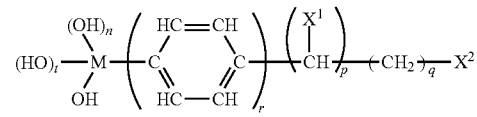

wherein n is 0 or 1, t is 0 or 1, r is 0 or 1, p is 0 to 2, q is 0 to 13, at least one of p and q is not zero, M is a metal that is not silicon, —$X^1$ is —$NH_2$ or —OH; and —X2 is selected from the group consisting of —SH, —$NH_2$, —COOH, and

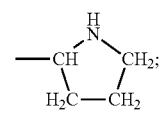

and (b) one or more isocyanate crosslinker having two or more isocyanate groups per molecule.

7 Claims, No Drawings

(56) References Cited

U.S. PATENT DOCUMENTS

| | | | |
|---|---|---|---|
| 6,211,262 B1 | 4/2001 | Mejiritski et al. | |
| 7,220,338 B2 | 5/2007 | Chen et al. | |
| 8,192,811 B2 | 6/2012 | Bourgeois | |
| 2009/0264587 A1* | 10/2009 | Blum | C08G 18/0823 524/591 |
| 2012/0225302 A1* | 9/2012 | Buchner | C08G 18/0823 428/423.1 |

OTHER PUBLICATIONS

Chartvvell International, "Adhesion Promoters for Coatings, Adhesives, Abrasives, Inks, Plastics and Rubber", (2013).

* cited by examiner

AQUEOUS POLYURETHANE DISPSERSIONS

One important use of adhesive compositions is to bond the layers of a laminate. For example, it is often desired to provide an adhesive composition that can bond a metal foil to a polymer film. It is desirable for reasons of safety and environmental protection that adhesive compositions be waterborne. A desirable method of using a waterborne adhesive composition to bond the layers of a laminate is dry bond lamination, which is a method in which a layer of the waterborne adhesive composition is applied to a first substrate, then the waterborne adhesive composition is dried or allowed to dry, then a second substrate is brought into contact with the dried adhesive composition.

It is desired that waterborne adhesive compositions be in the form of organic particles dispersed in a continuous aqueous medium. It is also desired that waterborne adhesive compositions are stable; for example, they should not show signs of settling or phase separation upon storage. It is further desired that the waterborne adhesive composition provide good adhesion to substrates, especially when bonding a metal foil to a polymer film.

U.S. Pat. No. 4,764,632 describes compositions which are comprised of a chemically united complex aluminum moiety, a teravalent zirconium moiety, and a multifunctional amino acid wherein the acid is chemically bound to both the aluminum and zirconium centers. U.S. Pat. No. 4,764,632 teaches that the composition may be used in adhesive formulations, such as formulations exemplified by resin components, which may include, but are not limited to, epoxy, phenolic, and various elastomers such as nitrile, vinyl butyral, SBR, EPDM, polyurethane, silicone, neoprene, styrene/butadiene block copolymers, and the like when applied to various substrates including metal, rubber, plastic, glass, and wood.

The following is a statement of the invention.

The first aspect of the present invention is an aqueous polyurethane dispersion comprising
  (a) dispersed particles of said polyurethane, wherein said polyurethane is the reaction product of polyurethane formation reactants comprising
    (i) one or more polyisocyanate,
    (ii) a polyol component comprising one or more polyol, and
    (iii) one or more organometallic compound having the structure

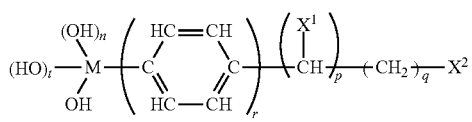

wherein n is 0 or 1, t is 0 or 1, r is 0 or 1, p is 0 to 2, q is 0 to 13, at least one of p and q is not zero, M is a metal that is not silicon, —$X^1$ is —$NH_2$ or —OH; and —X2 is selected from the group consisting of —SH, —$NH_2$, —COOH, and

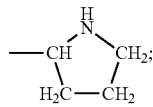

and
  (b) one or more isocyanate crosslinker having two or more isocyanate groups per molecule.

The second aspect of the present invention is a method of forming a laminate comprising
  (A) applying a layer of the composition of the first aspect of the present invention to a surface of a metal foil or a polymer film,
  (B) drying said layer or allowing said layer to dry to form a dried adhesive layer,
  (C) bringing said dried adhesive layer into contact with a surface of a metal foil or a polymer film to form said laminate.

The following is a detailed description of the invention.

As used herein, the following terms have the designated definitions, unless the context clearly indicates otherwise.

A metal foil is a piece of metal having length and width of at least 1 cm each and having thickness of 0.5 mm or less. A polymeric film is a piece of material made of an organic polymer having length and width of at least 1 cm each and having thickness of 0.5 mm or less.

A composition is said herein to be waterborne if the composition is liquid at 25° C. and contains 30% or more water by weight based on the weight of the composition. A waterborne composition contains a continuous fluid medium in which discreet droplets or particles may optionally be suspended. The continuous fluid medium contains water in the amount, by weight based on the weight of the continuous fluid medium, of 50% or higher. The continuous fluid medium is herein called an aqueous medium.

Compounds other than water that are contained in a waterborne composition are said herein to be distributed through the aqueous medium. Such compounds may be dissolved or dispersed or a combination thereof. Dispersed compounds exist as discreet droplets or particles; such particles may contain two or more substances. Dispersed droplets or particles have weight-average diameter of 5 nm or more. Compounds that are dissolved in the aqueous medium are distributed as individual molecules.

An isocyanate is a compound that contains one or more pendant isocyanate group —NCO. An isocyanate that contains more than one isocyanate group per molecule is a polyisocyanate. An isocyanate that contains exactly two isocyanate groups is a diisocyanate. A monomeric diisocyanate has the structure OCN—$R^1$—NCO, where —$R^1$— is a divalent organic group having no isocyanate groups, having no urethane linkages, and having molecular weight of less than 500. An aromatic polyisocyanate is a polyisocyanate that contains one or more aromatic rings directly linked to isocyanate groups per molecule.

A polyol is a compound having two or more —OH groups per molecule. A diol has exactly two —OH groups per molecule. A polyamine is a compound having two or more amine groups per molecule; the amine groups may be primary, secondary, or a mixture thereof. A diamine has exactly two amine groups per molecule.

An ester is a compound that contains an ester linkage, which has the structure

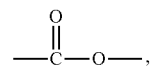

in which both of the open bonds are connected to carbon atoms. A polyester is a compound that contains three or more ester linkages per molecule. An ether is a compound that contains an ether linkage, which has the structure —O—, in which both open bonds are connected carbon atoms. A polyether is a compound that contains three or more ether linkages per molecule.

A urethane is a compound that contains a urethane linkage, which has the structure

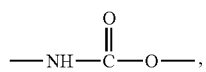

in which both of the open bonds are connected to carbon atoms. A polyurethane is a compound that contains three or more urethane linkages per molecule.

A urea linkage is the structure

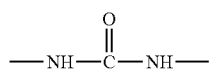

in which both of the open bonds are connected to carbon atoms.

The "solids" of an aqueous composition is the amount of non-volatile material contained in the composition. The category "non-volatile material" includes substances that are solid when in pure form at 25° C. and substances with boiling point of 150° C. or higher. Also included in the category "non-volatile material" are compounds that react with one or more other compounds during the process of drying the aqueous composition to form a product that does not evaporate during the process of drying the aqueous composition.

An organic solvent is a compound that is not water; that is a liquid at 25° C.; and that has boiling point of less than 300° C.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The adhesive composition of the present invention comprises an aqueous medium. Preferably, the amount of water in the aqueous medium, by weight based on the weight of the water, is 70% or more; or 80% or more; or 90% or more.

The composition of the present invention contains a polyurethane that is the reaction product of reactants that are herein called "polyurethane formation reactants."

The polyurethane formation reactants include one or more aromatic polyisocyanates. Preferred polyisocyanates are monomeric diisocyanates having molecular weight of 300 or less; more preferably 275 or less. Preferred are one or more isomers of MDI; more preferred are 4,4'-MDI and mixtures of 4,4'-MDI with other isomers of MDI; more preferred is a mixture of 4,4'-MDI with 2,4'-MDI. Among mixtures of 4,4'-MDI with 2,4'-MDI, preferably the ratio of 4,4'-MDI to 2,4'-MDI is 0.75:1 or greater; more preferably 1:1 or greater; more preferably 1.01:1 or greater; more preferably 1.1:1 or greater. Among mixtures of 4,4'-MDI with 2,4'-MDI, preferably the ratio of 4,4'-MDI to 2,4'-MDI is 3:1 or less; more preferably 2:1 or less; more preferably 1.5:1 or less.

Preferably, the total amount of aromatic polyisocyanates is, by weight based on the total weight of the polyurethane formation reactants, 8% or more; more preferably 12% or more. Preferably, the total amount of aromatic polyisocyanates is, by weight based on the total weight of the polyurethane formation reactants, 40% or less; more preferably 30% or less; more preferably 25% or less.

The polyurethane formation reactants also include a polyol component. Preferably, the amount of polyol component in the polyurethane formation reactants is, by weight based on the total weight of the polyurethane formation reactants, 50% or more; more preferably 60% or more; more preferably 70% or more. Preferably, the amount of polyol component in the polyurethane formation reactants is, by weight based on the total weight of the polyurethane formation reactants, 95% or less; more preferably 90% or less.

Preferably, no polyol is present in the polyurethane formation reactants other than polyols contained in the polyol component.

Preferably, the polyol component comprises one or more polyester polyols, one or more polyether polyols, one or more monomeric polyols, or a mixture thereof.

Preferably, the polyol component contains one or more polyester polyols. Among polyester polyols, preferred are those that are diols. Preferred polyester polyols have weight-average molecular weight (MW) of 750 or higher; more preferably 1000 or higher; more preferably 1,500 or higher. Preferred polyester polyols have weight-average molecular weight of 6,000 or lower; more preferably 4,000 or lower; more preferably 3,500 or lower.

Preferably, the polyol component contains one or more polyethylene glycol. A polyethylene glycol has the structure H—[—O—CH$_2$—CH$_2$-]$_n$—O—H. The parameter n is 3 or higher. Preferably, the weight-average molecular weight of polyethylene glycol is 500 or higher; more preferably 750 or higher. Preferably, the weight-average molecular weight is 3,000 or lower; more preferably 2,000 or lower; more preferably 1,500 or lower. Preferably, the total amount of polyethylene glycols in the polyol component, by weight based on the weight of the polyol component, is 1% or more; more preferably 2% or more. Preferably, the total amount of polyethylene glycols in the polyol component, by weight based on the weight of the polyol component, is 20% or less; more preferably 15% or less; more preferably 12% or less.

Preferably, the polyol component contains one or more diol having a hydrophilic side chain. A side chain is a chemical group that contains a linear chain of 6 or more atoms other than hydrogen; the side chain contains no hydroxyl groups or other groups that react with isocyanate under the conditions of the formation of the polyurethane of the present invention. Preferably, a diol having a hydrophilic side chain contains a linear chain of atoms that connects the two hydroxyl groups (the "main chain"), and an atom of the side chain is attached by a single bond to an atom in the main chain. A side chain is considered hydrophilic if a molecule were to be made by breaking the bond between the side chain and the main chain, and then capping the side chain fragment with a hydrogen atom, and that resulting molecule had solubility in water at 25° C. of 5% or more by weight based on the weight of the water.

Preferred side chains contain bonded units selected from ethylene oxide, propylene oxide, butylene oxide, and combinations thereof. The units may be arranged in a line or in a branched structure or in a mixture thereof. The units may be arranged randomly or in blocks or in a mixture thereof. Preferably, the number of ethylene oxide units is 10 or more; more preferably 15 or more. Preferably, the number of ethylene oxide units is 30 or fewer; more preferably 25 or fewer. Preferably, the number of propylene oxide units is 20 or fewer; more preferably 10 or fewer; more preferably 5 or fewer; more preferably zero. Preferably, the number of butylene oxide units is 10 or fewer; more preferably 5 or fewer; more preferably 2 or fewer; more preferably zero.

Also contemplated are polyols having a hydrophilic side chain (b) in which the side chain contains an anionic group. An anionic group is a group that when exposed to water at some range of pH values within the range of 5 to 10, exists in the anion form. Examples of polyols having a side chain that contains an anionic group are 1.2-dihydroxy-3-propane-sulfonic acid salt (DHPA) and dimethylolpropionic acid (DMPA).

Preferably the total amount of diols having a hydrophilic side chain in the polyol component is, by weight based on the weight of the polyol component, 0.1% or more; more preferably 0.2% or more; more preferably 0.4% or more. Preferably the total amount of diols having a hydrophilic side chain in the polyol component is, by weight based on the weight of the polyol component, 10% or less; more preferably 5% or less.

Optionally, the polyol component contains one or more monomeric diols. A monomeric diol is a diol that has molecular weight of less than 500. Among monomeric diols, preferred are those that have molecular weight of less than 400; more preferably less than 300; more preferably less than 200. Among monomeric diols, preferred are those that have either the structure HO—$R^1$—OH or the structure OH—$R^2$—O—$R^3$—OH, where each of $R^1$, $R^2$, and $R^3$ is independently a linear or branched alkyl group. Among monomeric diols, more preferred are those that have the structure OH—$R^2$—O—$R^3$—OH, When a monomeric diol is present, preferably, $R^2$ and $R^3$ are identical to each other. When a monomeric diol is present, preferably, $R^2$ has 3 carbon atoms.

It is useful to contemplate the category of "other" polyether polyols. This category contains any polyether polyol that does not fall into either the category of polyethylene glycols described herein above or the category of diols having a hydrophilic side chain. Among other polyether polyols, preferred are diols. Among other polyether polyols, preferred are those that contain polymerized units of one or more alkylene oxide; preferred are polymerized units of ethylene oxide, propylene oxide, butylene oxide, and combinations thereof. Among other polyether polyols, preferred are those that contain polymerized units of propylene oxide. Among other polyether polyols, preferred are those having weight-average molecular weight of 500 or higher; more preferably 1000 or higher. Among other polyether polyols, preferred are those having weight-average molecular weight of 10,000 or lower; more preferably 5,000 or lower.

Preferably, the polyurethane formation reactants comprise one or more polyamine. Preferred polyamines are diamines. Preferred polyamines are polyamines in which every amine group is a primary amine. Preferred polyamines are alkyl compounds having two or more primary amine groups attached and no other substituents. Preferred polyamines have molecular weight of 500 or less; more preferably 200 or less; more preferably 100 or less.

When a polyamine is used, preferably the amount of polyamine is, by weight based on the total weight of the polyurethane formation reactants, 0.1% or more; more preferably 0.2% or more; more preferably 0.3% or more. When a polyamine is used, preferably the amount of polyamine is, by weight based on the total weight of the polyurethane formation reactants, 5% or less; more preferably 2.5% or less; more preferably 1.5% or less.

The polyurethane formation reactants comprise one or more organometallic compound having structure (I):

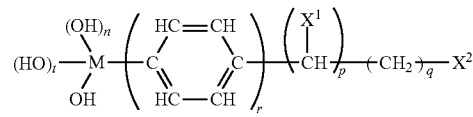

where n is 0 or 1, t is 0 or 1, r is 0 or 1, p is 0 to 2, q is 0 to 13, at least one of p and q is not zero, M is a metal that is not silicon, —$X^1$ is —$NH_2$ or —OH; and —X2 is selected from the group consisting of —SH, —$NH_2$, —COOH, and

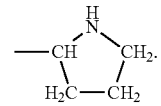

Preferably, r is 0. Preferably, p is 0. Preferably, q is 2 to 13. The group —$X^2$ is preferably —$NH_2$ or

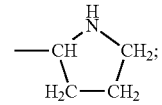

more preferably —$X^2$ is —$NH_2$.

Preferably, the amount of organometallic compound is, by weight based on the weight of the polyurethane formation reactants, 0.2% or more; more preferably 0.5% or more. Preferably, the amount of organometallic compound is, by weight based on the weight of the polyurethane formation reactants, 5% or less; more preferably 2% or less.

In some embodiments, the polyurethane formation reactants either contain no carboxyl-functional compound or else contain carboxyl-functional compound in an amount of 0.1% or less by weight based on the total weight of the polyurethane formation reactants.

It is useful to characterize the polyurethane content of the aqueous composition, which is the weight of the polyurethane, divided by the total weight of the aqueous composition, expressed as a percentage. Preferably, the polyurethane content of the aqueous composition is 10% or higher; more preferably 20% or higher; more preferably 25% or higher. Preferably, the polyurethane content of the aqueous composition is 60% or lower; more preferably 50% or lower; more preferably 45% or lower.

The aqueous composition of the present invention preferably contains one or more anionic surfactants. Anionic surfactants are compounds the molecules of which have a hydrophobic portion and a portion that is anionic. The molecules of preferred anionic surfactants contain a hydrocarbon group that has 6 or more carbon atoms; more preferably 8 or more carbon atoms; more preferably 10 or more carbon atoms. Hydrocarbon groups may be linear, branched, cyclic aliphatic, aromatic, or a combination thereof; preferred is a linear alkyl group attached to an aromatic ring. Preferred anionic groups are acid and salt forms of carboxyl groups, sulfate groups, and sulfonate groups. Preferred anionic groups are sulfonate groups. Preferred form of anionic groups is sodium salt.

Preferably, the amount of anionic surfactant in the aqueous composition is, by weight based on the solids weight of the aqueous composition, 0.5% or more; more preferably 0.8% or more; more preferably 2% or more. Preferably, the amount of anionic surfactant in the aqueous composition is, by weight based on the solids weight of the aqueous composition, 10% or less; more preferably 8% or less; more preferably 5% or less.

Preferably, the amount of organic solvent in the aqueous composition of the present invention is 4% or less; more preferably 2% or less; more preferably 1% or less.

Preferably the solids content of the aqueous composition of the present invention is 20% or higher; more preferably 30% or higher. Preferably the solids content of the aqueous composition of the present invention is 60% or lower; more preferably 50% or lower.

Preferably the volume-average particle size of the dispersed particles of polyurethane is 50 nm or larger; more preferably 100 nm or larger. Preferably the volume-average particle size of the dispersed particles of polyurethane is 500 nm or smaller; more preferably 350 nm or smaller.

The composition of the present invention may be made by any method. A preferred method is as follows.

The one or more polyisocyanates are mixed together with the polyol component and heated to make a polyurethane prepolymer. Preferably, the polyurethane prepolymer is isocyanate-functional. The polyurethane prepolymer is then optionally mixed with organic solvent. The resulting mixture is then mixed with an aqueous solution of an anionic surfactant under high-speed agitation. Then additional water is added under high-speed agitation, and a dispersion forms in which the continuous phase is aqueous and the dispersed particles contain polyurethane prepolymer. A polyamine is then added slowly under high-speed agitation to form polyurethane dispersion, followed by charging an organometallic compound of structure (I). If organic solvent was added, it is preferably removed, for example by evaporation. Also contemplated are embodiments in which organometallic compound of structure (I) is added prior to addition of polyamine, simultaneously with addition of polyamine, or any combination of adding organometallic compound prior to addition of polyamine, adding organometallic compound simultaneously with addition of polyamine, and adding organometallic compound after addition of polyamine.

It is contemplated that some or all of the organometallic compound will react with isocyanate groups attached to the preliminary polyurethane. It is contemplated that one or more —$X^2$ group will react with an isocyanate group to form a bond between the organometallic compound and the polyurethane. It is contemplated that in some embodiments, some of the organometallic compound will not react during the process of forming the polyurethane dispersion; in such embodiments, it is contemplated that some of the organometallic compound will be present in the composition of the present invention.

The composition of the present invention contains one or more isocyanate crosslinker. Preferably the isocyanate crosslinker is added to the composition after formation of dispersed particles of polyurethane.

An isocyanate crosslinker is a polyisocyanate that has two or more isocyanate groups per molecule. Preferred isocyanate crosslinkers are polyisocyanates that have three or more isocyanate groups per molecule. More preferred are trimers of monomeric diisocyanates. When the monomeric diisocyanate has the structure OCN—$R^4$—NCO, where —$R^4$- is a divalent organic group, the trimer has the structure

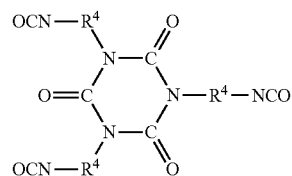

Preferred monomeric diisocyanates for use in making trimers are aliphatic diisocyanates. More preferred are 1,6 hexamethylene diisocyanate (HDI), 1-isocyanato-3-isocyanatomethyl-3,5,5-trimethyl-cyclohexane (IPDI), 4,4'-diisocyanato dicyclohexylmethane (H12MDI), and di-isocyanatomethyl-cyclohexane (ADI). More preferred are HDI and ADI; most preferred is HDI. Preferably, the isocyante crosslinker is water soluble or water dispersible. When such an isocyanate crosslinker is added to the composition, it becomes dissolved or dispersed in the aqueous medium. A preferred way to add isocyanate crosslinker to the composition is to prepare a mixture of isocyanate crosslinker and a hydrophilically modified version of the same isocyanate crosslinker. Hydrophilic modification is a process in which one or more of the isocyanate groups on the isocyanate crosslinker is reacted with a compound to attach a hydrophilic group to the residue of the isocyanate group. Preferred hydrophilic groups are anionic groups and groups containing residues of ethylene oxide. Preferably, the mixture of isocyanate crosslinker and the hydrophilically modified version of that isocyanate crosslinker can be dispersed in water.

When a mixture of isocyanate crosslinker and the hydrophilically modified version of that isocyanate crosslinker is used, it is preferred that the isocyanate crosslinker is has three or more —NCO groups per molecule. More preferably, the isocyanate crosslinker is a trimer of a monomeric diisocyanate.

Preferably, the amount of isocyanate crosslinker, by weight based on the total weight of the composition, is 0.5% or more; more preferably 1% or more. Preferably, the amount of isocyanate crosslinker, by weight based on the total weight of the composition, is 8% or less; more preferably 4% or less.

A particularly preferred use for the composition of the present invention is as a laminating adhesive. The use as a laminating adhesive is described as follows.

A layer of waterborne adhesive composition is preferably applied to a surface of a metal foil. Preferably, the metal foil is aluminum foil. Preferably, the thickness of the metal foil is 1 μm or more; more preferably 3 μm or more. Preferably, the thickness of the metal foil is 25 μm or less; more preferably 15 μm or less.

Preferably the layer of waterborne adhesive composition is dried or allowed to dry to form a layer of dried adhesive composition. Drying may be accomplished by any method, including, for example, one or more of passage of time, applying heat, and exposing to moving air. The layer of adhesive composition is considered to be dried when the amount of water remaining in the layer of adhesive composition is 10% or less by weight, based on the weight of water that was applied as part of the waterborne adhesive composition.

The dried layer of adhesive composition is preferably brought into contact with the surface of a polymer film. Preferred polymers for the polymer film are organic polymers; more preferred are polyolefins, polyolefin copolymers, polycarbonates, polyesters, and polyamides. Polyolefins are homopolymers and copolymers of olefin monomers, which are hydrocarbon molecules containing one or more carbon-carbon double bond. Polyolefin copolymers are copolymers of one or more olefin monomer with one or more vinyl acetate, acrylate monomers, and methacrylate monomers. Preferred polymers are polyethylene, polyethylene terephthalate, and nylon; more preferred is polyethylene.

After the polymer film comes into contact with the layer of dried adhesive composition, the composite article thus formed is known as a laminate. The laminate is preferably subjected to mechanical force to press the polymer film and the metal foil towards each other. Such mechanical force is preferably applied by passing the composite article between rollers.

In some embodiments of the present invention, the composite article made of the metal foil, the layer of adhesive composition, and the polymer film is part of a larger composite article that contains further layers. The further layers may contain one or more polymer films, one or more layers of adhesive compositions, and one or more metal foils; any polymer films, adhesive compositions, or metal foils present in the further layers may be the identical to or different from each other and from the polymer film, adhesive composition, and metal foil present in the above-described composite article.

For example, in some embodiments, a larger composite article is made as follows. A first layer of adhesive composition is applied to a polyethylene terephthalate film, and that first adhesive composition is brought into contact with one surface of a metal foil. Then, on the opposite surface of the metal foil, a second layer of adhesive composition is applied, and that second adhesive composition is brought into contact with a surface of a polymer film of polyethylene. Preferably, among such embodiments, both the first layer of adhesive composition and the second layer of adhesive composition are layers of the waterborne adhesive composition of the present invention, and preferably each layer is dried prior to contact with the next substrate.

The following are examples of the present invention.
The following ingredients were used:

TABLE 1

Raw material information for polyurethane dispersion (PUD)

| Component | Grade name | Characteristic | Supplier |
|---|---|---|---|
| Polyester polyol | Capa ™ 2302 | Mw = 3000 | Perstop |
| isocyanate | Isonate ™ 50 OP | 2,4-MDI/4,4'-MDI = 45/55 | Dow |
| Polyethylene glycol monomethyl ether | CARBOWAX ™ Methoxy polyethylene Glycol 1000 | Mw = 1000, Polyethylene glycol monomethyl ether >= 99.0% | Dow |
| Polyethylene glycol | PEG1000 | Mw = 1000 | Dow |
| Diols with long alkoxy side chain | Ymer N 120 | Mw = 1000, EO as side chain | Perstop |
| monomeric diol | Dipropylene glycol | Chemically pure grade | TCI |
| surfactant | Rhodacal ™ DS-4 | Sodium dodecylbenzene sulfonate(23% solid) | Rhodia |
| polyamine | 1,2-propane diamine | Chemically pure grade | TCI |
| water | Deionized water | | |
| crosslinker | CR3A | HDI trimer | Dow |
| Organometallic complex | B-515.7W | Additive | Chartwell |

Formation of PUD-1

Added 27.9 g Isonate 50 OP to a mixture of 107.2 g Capa 2302, 12 g PEG1000, 3.8 g DPG, and 5 g Ymer N 120, then reacted at 65-90° C. for 4-5 h until the mixture reached the theoretical NCO content. Transferred the prepolymer into a plastic jar, and added 19.8 g DS-4 into plastic jar under high speed (2000-3000 rpm) for 1-3 minutes, then added 330 g cold DI water (5° C.) under high speed to ensure a homogeneous oil-in-water dispersion, then added 3.4 g PDA water solution (20%) into the dispersion slowly, then maintained stirring at 1000-1500 rpm for 15-30 minutes, then added 1.7 g B-515.71W, then maintained stirring at 1000 to 1500 rpm for 15 to 30 minutes. An aqueous dispersion with solid content of 31.6%, pH of 6.4 was achieved.

Formation of Comparative PUD-C2 (No Organometallic Compound; to be Compared with PUD-1):

Added 27.9 g Isonate 50 OP to a mixture of 107.2 g Capa 2302, 12 g PEG1000, 3.8 g DPG, and 5 g Ymer N 120, then reacted at 65-90° C. for 4-5 h until the mixture reached the theoretical NCO content. Transferred the prepolymer into a plastic jar, and added 19.8 g DS-4 into plastic jar under high speed (2000-3000 rpm) for 1-3 minutes, then added 330 g cold DI water (5° C.) under high speed to ensure a homogeneous oil-in-water dispersion, then added 3.4 g PDA water solution (20%), then maintained stirring at 1000-1500 rpm for 15-30 minutes. An aqueous dispersion with solid content of 31.6%, pH of 6.4 was achieved.

Formation of PUD-3

Added 44.7 g Isonate 50 OP to a mixture of 102.5 g Voranol V 9287A, 89.7 g PTMEG, 6.2 g PEG1000, and 5.1 g MPEG1000, then reacted at 65-90° C. for 4-5 h until the mixture reaches the theoretical NCO content. Then transferred the prepolymer into a plastic jar, and added 31.6 g DS-4 into plastic jar under high speed (2000-3000 rpm) for 1-3 minutes, then added 360 g cold DI water (5° C.) into plastic jar under high speed to ensure a homogeneous oil-in-water dispersion, then added 8.2 g PDA water solution (20%) into the dispersion slowly, then maintained stirring at 1000-1500 rpm for 15-30 minutes, then 2.3 g B-515.71W was added, then maintained stirring at 1000 to 1500 rpm for 15 to 30 minutes. An aqueous dispersion with solid content of 40%, pH of 6.5 was achieved.

Formation of Comparative PUD-C4 (No Organometallic Compound; to be Compared with PUD-3):

Added 44.7 g Isonate 50 OP to the mixture of 102.5 g Voranol V 9287A, 89.7 g PTMEG, 6.2 g PEG1000 and 5.1 g MPEG1000, then reacted at 65-90° C. for 4-5 h until it reached the theoretical NCO content. Transferred the prepolymer into a plastic jar, and added 31.6 g DS-4 into plastic jar under high speed (2000-3000 rpm) for 1-3 minutes, then added 360 g cold DI water (5° C.) into plastic jar under high speed to ensure a homogeneous oil-in-water dispersion, then added 8.2 g PDA water solution (20%), then maintained stirring at 1000-1500 rpm for 15-30 minutes. An aqueous dispersion with solid content of 40%, pH of 6.5 was achieved.

Application Test

Each of the above mentioned PUDs was mixed with 2% of cross-linker CR3A based on the total weight of PUD under 1000 rpm stirring for 10 min (except as noted below), then coated on the primary substrates with 2.0-2.3 gram per square meter coating weight using K101 control coater. Oven was used to drive off the water in the adhesive. Then hot roll laminator HL-101 was used to laminate the secondary substrate onto the primary substrate. The nip temperature was kept around 65° C. during the laminations. Then the laminated film was conditioned at room temperature for 7 days prior to conducting T-peel bonding strength test in Instron 5943 machine with 250 mm/min speed, the results as below. Results are reported in Newtons per 15 mm width.

| | Formulation Number | | | | |
|---|---|---|---|---|---|
| | 1 | C2 | C1A | 3 | C4 |
| PUD | PUD-1 | PUD-C2 | PUD-1 | PUD-3 | PUD-C4 |
| crosslinker | 2% CR3A | 2% CR3A | none | 2% CR3A | 2% CR3A |
| foil/PE | 5.6 N | 3.5 N | 0.5 N | 2.0 N | 1.2 N |
| PET/foil | 2.9 N | 2.5 N | 0.2 N | 0.8 N | 1.0 N |

Remark: the higher the bonding strength value, the better the bonding results.

The inventive Formulation 1 affords higher bond strength to PE, PET and foil, compared with the Comparative Formulation C2. The inventive Formulation 3 affords higher bond strength to foil and PE compared with Comparative Formulation C4. The results for PET/Foil adhesion are comparable for inventive Formulation 3 and Comparative Formulation C4. Comparative Formulation C1A, which lacks isocyanate crosslinker, had poor adhesion compared to all the other formulations.

Both Formulation 1 and Formulation 3 show acceptable properties, but comparing Formulation 1 (which uses polyester polyol) with Formulation 3 (which uses polyether polyol) shows that Formulation 1 gives better adhesion.

The invention claimed is:

1. An aqueous polyurethane dispersion comprising
   (a) dispersed particles of said polyurethane, wherein said polyurethane is the reaction product of polyurethane formation reactants comprising
      (i) one or more polyisocyanate,
      (ii) a polyol component comprising one or more polyol, and
      (iii) one or more organometallic compound having the structure $$(HO)_t-M\begin{pmatrix}(OH)_n\\OH\end{pmatrix}\left(C\begin{matrix}HC=CH\\ \\HC-CH\end{matrix}C\right)_r\left(\begin{matrix}X^1\\|\\CH\end{matrix}\right)_p(CH_2)_q-X^2$$

wherein n is 0 or 1, t is 0 or 1, r is 0 or 1, p is 0 to 2, q is 0 to 13, at least one of p and q is not zero, M is a metal that is not silicon, —$X^1$ is —$NH_2$ or —OH; and —$X^2$ is selected from the group consisting of —SH, —$NH_2$, —COOH, and $$-CH\begin{matrix}H\\|\\N\\ \\H_2C-CH_2\end{matrix}CH_2;$$

and
   (b) one or more isocyanate crosslinker having two or more isocyanate groups per molecule.

2. The aqueous dispersion of claim 1 wherein said r is 0, said p is 0 and said q is 2 to 13.

3. The aqueous dispersion of claim 1 wherein said polyol component comprises one or more polyester polyol, one or more polyether polyol, or a mixture thereof.

4. The aqueous dispersion of claim 1 wherein said isocyanate crosslinker comprises a hydrophilically modified polyisocyanate.

5. The aqueous dispersion of claim 1 wherein said isocyanate crosslinker comprises a hydrophilically modified trimer of a monomeric diisocyanate having the structure OCN—R4-NCO, wherein —R4- is a divalent organic group.

6. The aqueous dispersion of claim 5, wherein the hydrophilically modified trimer comprises a hydrophilic group that comprises residues of ethylene oxide.

7. A method of forming a laminate comprising
   (A) applying a layer of an aqueous polyurethane dispersion to a surface of a metal foil or a polymer film, wherein the aqueous polyurethane dispersion comprises
      (a) dispersed particles of said polyurethane, wherein said polyurethane is the reaction product of polyurethane formation reactants comprising
         (i) one or more polyisocyanate,
         (ii) a polyol component comprising one or more polyol, and
         (iii) one or more organometallic compound having the structure $$(HO)_t-M\begin{pmatrix}(OH)_n\\OH\end{pmatrix}\left(C\begin{matrix}HC=CH\\ \\HC-CH\end{matrix}C\right)_r\left(\begin{matrix}X^1\\|\\CH\end{matrix}\right)_p(CH_2)_q-X^2$$

wherein n is 0 or 1, t is 0 or 1, r is 0 or 1, p is 0 to 2, q is 0 to 13, at least one of p and q is not zero, M is a metal that is not silicon, —$X^1$ is —$NH_2$ or —OH; and —$X^2$ is selected from the group consisting of —SH, —$NH_2$, —COOH, and $$-CH\begin{matrix}H\\|\\N\\ \\H_2C-CH_2\end{matrix}CH_2;$$

and
      (b) one or more isocyanate crosslinker having two or more isocyanate groups per molecule;
   (B) drying said layer or allowing said layer to dry to form a dried adhesive layer,
   (C) bringing said dried adhesive layer into contact with a surface of a metal foil or a polymer film to form said laminate.

* * * * *